(12) United States Patent
Muhammad et al.

(10) Patent No.: US 12,267,014 B2
(45) Date of Patent: Apr. 1, 2025

(54) NON-ISOLATED DCDC RESONANT CONVERSION CONTROL CIRCUIT AND CONTROL METHOD

(71) Applicant: HUAWEI TECHNOLOGIES CO., LTD., Guangdong (CN)

(72) Inventors: Yaqoob Muhammad, Kista (SE); Shengyong Dai, Dongguan (CN); Qingzu Hong, Shenzhen (CN); Xiao Zhang, Xi'an (CN); Grover Victor Torrico-Bascopé, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 17/976,010

(22) Filed: Oct. 28, 2022

(65) Prior Publication Data

US 2023/0053061 A1 Feb. 16, 2023

Related U.S. Application Data

(63) Continuation of application No. PCT/CN2021/087996, filed on Apr. 19, 2021.

(30) Foreign Application Priority Data

Apr. 29, 2020 (CN) .......................... 202010360907.4

(51) Int. Cl.
*H02M 3/158* (2006.01)
*H02M 1/00* (2006.01)
*H02M 3/00* (2006.01)

(52) U.S. Cl.
CPC ......... *H02M 3/158* (2013.01); *H02M 1/0058* (2021.05); *H02M 3/01* (2021.05); *H02M 3/1582* (2013.01)

(58) Field of Classification Search
CPC .... H02M 3/1582; H02M 3/01; H02M 1/0058; H02M 3/158
See application file for complete search history.

(56) References Cited

U.S. PATENT DOCUMENTS

| | | | |
|---|---|---|---|
| 11,784,600 B2 * | 10/2023 | Xu | H02M 3/1582 |
| | | | 318/400.3 |
| 2009/0034299 A1 * | 2/2009 | Lev | H02M 3/33592 |
| | | | 363/17 |

(Continued)

FOREIGN PATENT DOCUMENTS

| CN | 102158096 B | 11/2013 |
|---|---|---|
| CN | 108054918 A | 5/2018 |

(Continued)

OTHER PUBLICATIONS

International Search Report for PCT/CN2021/087996 dated Apr. 19, 2021, 12 pages.

(Continued)

*Primary Examiner* — Harry R Behm

(57) ABSTRACT

According to a non-isolated DCDC resonant conversion control circuit provided in embodiments of this application, an inductor and a capacitor that are resonant are connected in series, so that a current flowing through the inductor is a sine waveform. A waveform coefficient of the sine wave is small, and a conduction loss of the sine wave is low. Therefore, the circuit provided in embodiments of this application can significantly reduce a circuit loss. According to the non-isolated DCDC resonant conversion control method provided in embodiments of this application, not only a phase shift angle can be adjusted to enable a switching transistor to implement zero voltage switching (ZVS) on, but switching frequency can also be adjusted. Therefore, ranges in which a voltage and power of an output interface (Continued)

can be adjusted are large, so that non-isolated wide-range DCDC resonant conversion is implemented.

16 Claims, 12 Drawing Sheets

(56) References Cited

U.S. PATENT DOCUMENTS

2015/0171729 A1\* 6/2015 Scandola ............. H02M 3/158
363/21.02
2015/0270731 A1\* 9/2015 Adelmann ............... H02J 7/00
320/101

FOREIGN PATENT DOCUMENTS

| CN | 108075668 A | 5/2018 |
| CN | 108539980 A | 9/2018 |
| CN | 111614256 A | 9/2020 |

OTHER PUBLICATIONS

Chinese Office Action for Application No. 202010360907 dated Apr. 2, 2021, 14 pages.

\* cited by examiner

NON-ISOLATED DCDC RESONANT CONVERSION CONTROL CIRCUIT AND CONTROL METHOD

CROSS-REFERENCE TO RELATED APPLICATIONS

This application is a continuation of International Application No. PCT/CN2021/087996, filed on Apr. 19, 2021, which claims priority to Chinese Patent Application No. 202010360907.4, filed on Apr. 29, 2020. The disclosures of the aforementioned applications are hereby incorporated by reference in their entireties.

TECHNICAL FIELD

Embodiments of this application relate to the field of circuit technologies, and in particular, to a non-isolated DCDC resonant conversion control circuit and a control method.

BACKGROUND

With the development of lithium battery applications, there are increasingly high demands for a non-isolated DCDC buck-boost converter. Currently, various topologies and technologies of non-isolated DCDC converters are proposed. However, a basic model based on Buck and Boost is basically used, and a current is generally a triangular wave. Content of high-order harmonic waves is high, and this is not conducive to further improvement of efficiency.

FIG. 1 is a topology diagram of a circuit of an existing non-isolated DCDC buck-boost converter. FIG. 2 is a waveform diagram of a current in an inductor L in the circuit shown in FIG. 1. It can be seen from FIG. 1 that, the circuit includes a power supply $V_{in}$, a switch S1, a switch S2, a switch S3, a switch S4, an inductor L, and an output $V_o$. When the circuit implements a boost function, S1 is always on, S2 is always off, and the inductor L and the switching transistors S2 and S3 implement a boost circuit function. When the circuit implements a buck function, S3 is always on, S4 is always off, and the inductor L and the switching transistors S1 and S2 implement a buck circuit function. It can be seen from FIG. 2 that, the circuit is controlled in a conventional buck or boost critical continuous mode, so that a switching transistor can implement zero voltage switching (ZVS) on, but an inductance current is a triangular wave, a peak current is relatively large, and a turn-off current of the switching transistor is relatively large. A waveform coefficient of the triangular wave is greater than a waveform coefficient of a sine wave, and a triangular wave has a larger conduction loss than the sine wave when same power is transmitted. High content of high-order harmonic waves in the triangular wave increases a high-order harmonic wave loss.

SUMMARY

Embodiments of this application provide a non-isolated DCDC resonant conversion control circuit and control method, to resolve a technical problem that a loss of an existing non-isolated DCDC buck-boost converter is large.

According to a first aspect, a non-isolated DCDC resonant conversion control circuit is provided in an embodiment of this application, and includes an input interface, a first switching transistor, a second switching transistor, a third switching transistor, a fourth switching transistor, an inductor, a capacitor, and an output interface. After being connected in series, the first switching transistor and the second switching transistor are coupled to the input interface in series. After being connected in series, the third switching transistor and the fourth switching transistor are coupled to the output interface in series. A node on which the first switching transistor and the second switching transistor are connected in series is an end A. A node on which the third switching transistor and the fourth switching transistor are connected in series is an end B. After being connected in series, the inductor and the capacitor are coupled between the end A and the end B. A negative electrode of the input interface is coupled to a negative electrode of the output interface, or a positive electrode of the input interface is coupled to a positive electrode of the output interface. According to the non-isolated DCDC resonant conversion control circuit provided in this embodiment of this application, the inductor and the capacitor are connected in series, so that a current flowing through the inductor is a sine waveform. A waveform coefficient of a sine wave is small, and a conduction loss of the sine wave is low. Therefore, the circuit provided in this embodiment of this application can significantly reduce a circuit loss.

With reference to the first aspect, in a possible implementation, the inductor and the capacitor are in a resonant working state.

With reference to the first aspect, in a possible implementation, a phase shift angle θ of a voltage between the input interface and the output interface meets:

$$\theta = \cos^{-1}\left(\frac{V_{out}}{V_{in}}\right) \text{ when } \frac{V_{out}}{V_{in}} \le 1,$$

$$\text{and } \theta = \cos^{-1}\left(\frac{V_{in}}{V_{out}}\right) \text{ when } \frac{V_{in}}{V_{out}} \le 1,$$

where $V_{in}$ is a voltage of the input interface, and $V_{out}$ is a voltage of the output interface.

With reference to the first aspect, in a possible implementation, output power $P_0$ of the output interface is:

$$P_o = \frac{2 * V_{in} * V_{out}}{\pi^2 * \left(2\pi f_s * L - \frac{1}{2\pi f_s * C}\right)} * \sin\theta,$$

where $V_{in}$ is the voltage of the input interface, $V_{out}$ is the voltage of the output interface, $f_s$ is switching frequency, L is an inductance value of the inductor, C is a capacitance value of the capacitor, and θ is the phase shift angle of the voltage between the input interface and the output interface.

With reference to the first aspect, in a possible implementation, when the first switching transistor is on, the second switching transistor is off; when the first switching transistor is off, the second switching transistor is on; when the third switching transistor is on, the fourth switching transistor is off; and when the third switching transistor is off, the fourth switching transistor is on.

With reference to the first aspect, in a possible implementation, the control circuit further includes a control unit; and the control unit is coupled to the first switching transistor, the second switching transistor, the third switching transistor, and the fourth switching transistor, and is configured to control on and off of the first switching transistor, the second switching transistor, the third switching transistor, and the fourth switching transistor.

With reference to the first aspect, in a possible implementation, the control circuit further includes a phase shift angle adjustment unit; and the phase shift angle adjustment unit is configured to determine the phase shift angle θ of the voltage between the input interface and the output interface based on the voltage of the input interface and a target voltage of the output interface.

With reference to the first aspect, in a possible implementation, the control circuit further includes a frequency adjustment unit; and the frequency adjustment unit is configured to determine switching frequency of the first switching transistor in the control circuit based on the phase shift angle θ and first target power or a first target current of the output interface.

With reference to the first aspect, in a possible implementation, the frequency adjustment unit is further configured to adjust the switching frequency based on the phase shift angle θ and second target power or a second target current of the output interface.

According to a second aspect, a non-isolated DCDC resonant conversion control method is provided in an embodiment of this application. Based on the control circuit in the first aspect, the control method includes: determining a phase shift angle θ of a voltage between an input interface and an output interface based on a voltage of the input interface and a target voltage of the output interface; determining switching frequency of a first switching transistor in the control circuit based on the phase shift angle θ and first target power or a first target current of the output interface; and controlling, based on the phase shift angle θ and the switching frequency, the first switching transistor, a second switching transistor, a third switching transistor, and a fourth switching transistor in the control circuit to be on or off.

With reference to the second aspect, in a possible implementation, the determining a phase shift angle θ based on a voltage of the input interface and a target voltage of the output interface includes: determining the phase shift angle θ based on the voltage of the input interface and the target voltage of the output interface by using a phase shift angle calculation formula, where the phase shift angle calculation formula is:

$$\theta = \cos^{-1}\left(\frac{V_{out}}{V_{in}}\right) \text{ when } \frac{V_{out}}{V_{in}} \leq 1,$$

$$\text{and } \theta = \cos^{-1}\left(\frac{V_{in}}{V_{out}}\right) \text{ when } \frac{V_{in}}{V_{out}} \leq 1,$$

where $V_{in}$ is the voltage of the input interface, and $V_{out}$ is the target voltage of the output interface.

With reference to the second aspect, in a possible implementation, the determining switching frequency based on the phase shift angle θ and first target power or a first target current of the output interface includes: determining the switching frequency based on an output power calculation formula, the phase shift angle θ, and the first target power or the first target current of the output interface, where the output power calculation formula is:

$$P_o = \frac{2 * V_{in} * V_{out}}{\pi^2 * \left(2\pi f_s * L - \frac{1}{2\pi f_s * C}\right)} * \sin\theta,$$

where $P_0$ is the first target power of the output interface, $V_{in}$ is the voltage of the input interface, $V_{out}$ is the target voltage of the output interface, $f_s$ is the switching frequency, L is an inductance value of an inductor, C is a capacitance value of a capacitor, and θ is the phase shift angle of the voltage between the input interface and the output interface.

With reference to the second aspect, in a possible implementation, the determining the phase shift angle θ based on the voltage of the input interface and the target voltage of the output interface by using a phase shift angle calculation formula includes: adjusting the phase shift angle θ, and calculating a voltage of the output interface by using the phase shift angle calculation formula until the voltage of the output interface reaches the target voltage of the output interface.

With reference to the second aspect, in a possible implementation, after the determining the switching frequency based on an output power calculation formula, the phase shift angle θ, and the first target power or the first target current of the output interface, the method further includes: adjusting the switching frequency, and calculating power of the output interface by using the output power calculation formula until the power of the output interface reaches second target power of the output interface.

With reference to the second aspect, in a possible implementation, the determining the switching frequency based on an output power calculation formula, the phase shift angle θ, and the first target power or the first target current of the output interface includes: obtaining the first target power of the output interface through calculation by using a target current of the output interface and the target voltage of the output interface; and determining the switching frequency based on the output power calculation formula, the phase shift angle θ, and the first target power or the first target current of the output interface.

With reference to the second aspect, in a possible implementation, the controlling, based on the phase shift angle θ and the switching frequency, the first switching transistor, a second switching transistor, a third switching transistor, and a fourth switching transistor in the control circuit to be on or off specifically includes: when the first switching transistor is controlled to be on, controlling the second switching transistor to be off; when the first switching transistor is controlled to be off, controlling the second switching transistor to be on; when the third switching transistor is controlled to be on, controlling the fourth switching transistor to be off; and when the third switching transistor is controlled to be off, controlling the fourth switching transistor to be on.

According to a third aspect, a power supply system is provided in an embodiment of this application, and includes a power supply module and the non-isolated DCDC resonant conversion control circuit according to the first aspect. The power supply module is connected to an input interface of the non-isolated DCDC resonant conversion control circuit, and outputs electric energy to the non-isolated DCDC resonant conversion control circuit, to increase an output voltage or decrease an output voltage.

With reference to the third aspect, in a possible implementation, the power supply module is a lithium battery or a photovoltaic power supply.

It can be learned from the foregoing technical solutions that embodiments of this application have the following advantages.

According to the non-isolated DCDC resonant conversion control circuit provided in embodiments of this application, the inductor and the capacitor that are resonant are connected in series, so that a current flowing through the inductor is a sine waveform. A waveform coefficient of a sine wave is small, and a conduction loss of the sine wave is low. Therefore, the circuit provided in embodiments of this application can significantly reduce a circuit loss. According to the non-isolated DCDC resonant conversion control method provided in embodiments of this application, not only the phase shift angle can be adjusted to enable the switching transistor to implement zero voltage switching ZVS on, but the switching frequency can also be adjusted. Therefore, ranges in which a voltage and power of the output interface can be adjusted are large, so that non-isolated wide-range DCDC resonant conversion is implemented.

DESCRIPTION OF EMBODIMENTS

Embodiments of this application provide a non-isolated DCDC resonant conversion control circuit and control method, to resolve a technical problem that a loss of an existing non-isolated DCDC buck-boost converter is large.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that the embodiments of this application described herein can be implemented in other orders than the order illustrated or described herein. Moreover, the terms "include", "corresponding to", and any other variants thereof mean to cover the non-exclusive inclusion. For example, a process, method, system, product, or device that includes a list of steps or units is not necessarily limited to those steps or units, but may include other steps or units not expressly listed or inherent to such a process, method, product, or device.

In addition, in embodiments of this application, a word such as "example" or "for example" is used to represent giving an example, an illustration, or a description. Any embodiment or design solution described as "example" or "for example" in embodiments of this application should not be explained as being more preferred or advantageous over other embodiments or design solutions. Exactly, use of the word "example", "for example" or the like is intended to present a relative concept in a specific manner.

Figure 1:
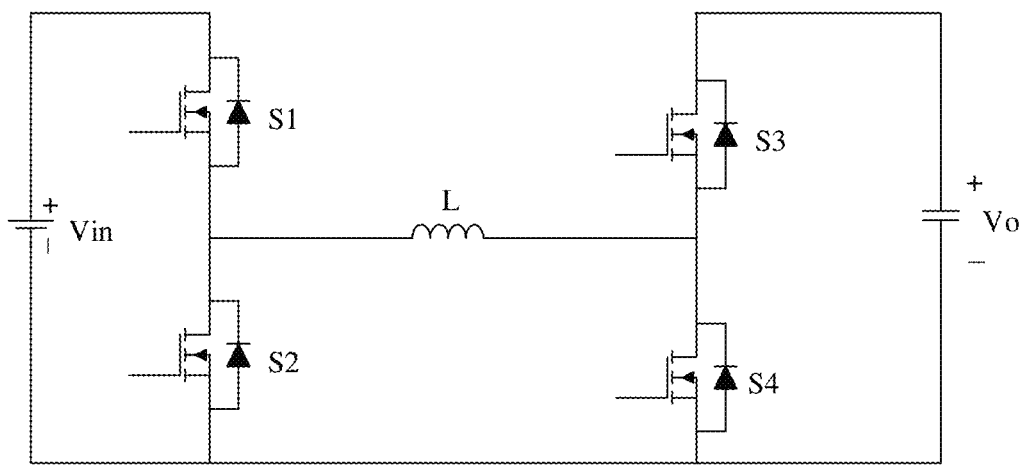
FIG. 1 is a topology diagram of a circuit of an existing non-isolated DCDC buck-boost converter.
Figure 2:
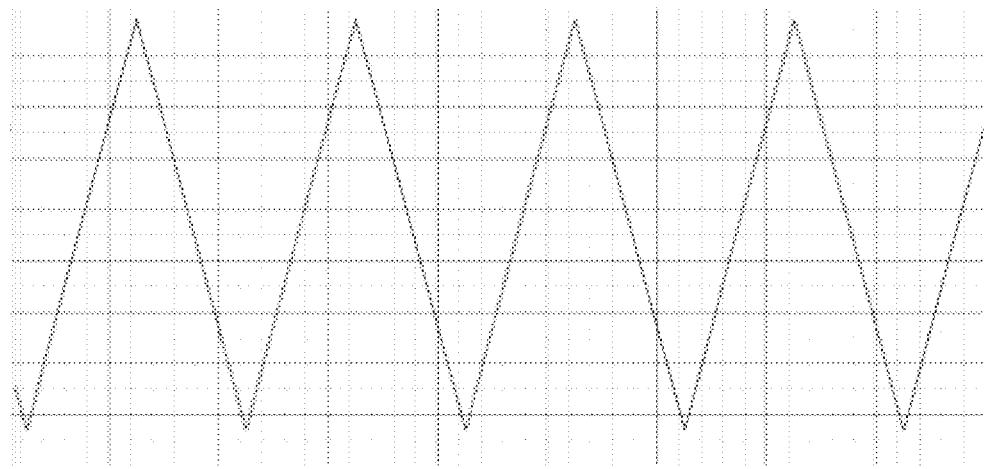
FIG. 2 is a waveform diagram of a current in an inductor L in the circuit shown in FIG. 1.

In a circuit shown in FIG. 1, a waveform diagram of a current in an inductor L is shown in FIG. 2. The waveform is a triangular wave of which the peak current is large, and a turn-off current of a switching transistor is relatively large. A waveform coefficient of the triangular wave is greater than a waveform coefficient of a sine wave, and a conduction loss of the triangular wave is also greater than that of the sine wave when same power is transmitted. High content of high-order harmonic waves of a triangular wave current increases a high-order harmonic wave loss.

Figure 3:
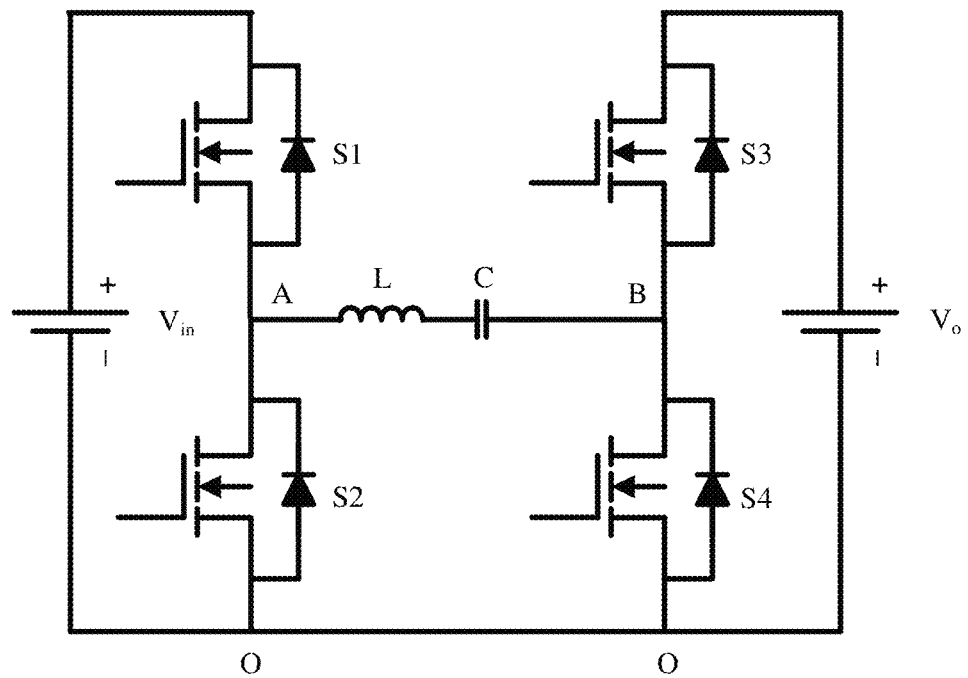
FIG. 3 is a circuit diagram of a non-isolated DCDC resonant conversion control circuit according to an embodiment of this application.

In embodiments of this application, for the foregoing problem, a non-isolated DCDC resonant conversion control circuit is provided. FIG. 3 is a circuit diagram of a non-isolated DCDC resonant conversion control circuit according to an embodiment of this application. The circuit includes an input interface, an output interface, a switching transistor S1, a switching transistor S2, a switching transistor S3, a switching transistor S4, an inductor L, and a capacitor C.

A voltage of the input interface is $V_{in}$. As an input interface of the non-isolated DCDC resonant conversion control circuit, the input interface may be connected to a direct-current device, another power supply device (such as a lithium battery), another communication device, or the like. This is not limited in this embodiment of this application. Similarly, a voltage of the output interface is $V_o$, and the output interface may also be connected to a direct-current device (such as a motor) or another communication device. This is not limited in this embodiment of this application.

In some embodiments, the switching transistor S1, the switching transistor S2, the switching transistor S3, and the switching transistor S4 may be switching transistors of a same type, or may be switching transistors of different types. This is not limited in this embodiment of this application.

In some embodiments, the switching transistor S1, the switching transistor S2, the switching transistor S3, and the switching transistor S4 may be transistors, may be MOS transistors, or may be insulated gate bipolar transistors (IGBT), and have controllable on and off functions. Specific types of the switching transistor S1, the switching transistor S2, the switching transistor S3, and the switching transistor S4 are not limited in this embodiment of this application.

As shown in FIG. 3, the switching transistor S1 and the switching transistor S2 are connected in series to form a front bridge arm. The front bridge arm is coupled to the input interface in series. The switching transistor S3 and the switching transistor S4 are connected in series to form a rear bridge arm. The rear bridge arm is coupled to the output interface in series. A midpoint at which the switching transistor S1 and the switching transistor S2 are connected in series is an end A. A midpoint at which the switching transistor S3 and the switching transistor S4 are connected in series is an end B. The inductor L and the capacitor C are connected in series between the end A and the end B.

In this embodiment of this application, if a negative electrode of the input interface is coupled to a negative electrode of the output interface, the input interface and the output interface share a same negative electrode, and can provide a current loop. In some other embodiments, if a positive electrode of the input interface is coupled to a positive electrode of the output interface, the input interface and the output interface share a same positive electrode, and similarly, can provide a current loop.

In this embodiment of this application, after being connected in series, the inductor L and the capacitor C are coupled between the end A and the end B, as shown in FIG. 3. In addition, the inductor L and the capacitor C are in a resonant working state. Resonance includes parallel resonance and serial resonance. In this embodiment of this application, serial resonance is described. A resonance circuit including the inductor L and the capacitor C that are connected in series is referred to as a series resonance circuit. When the series resonance circuit works in a resonant state, the following formula is met:

$X_L = X_C$.

$X_L$ is impedance of the inductor L, and $X_C$ is impedance of the capacitor C. In another expression, the following formula may alternatively be met:

$$\omega L = \frac{1}{\omega C}.$$

ω is angular frequency of a power supply of the series resonance circuit, L is an inductance value of the inductor L, and C is a capacitance value of the capacitor C.

In some embodiments, a position of the inductor L and a position of the capacitor C may be exchanged. A circuit obtained after the exchange is similar to the circuit in the embodiment corresponding to FIG. 3, and details are not described herein again.

In this embodiment of this application, the capacitance value C selected in the circuit is relatively small, so that the inductor L and the capacitor C work in a resonant state.

Figure 4:
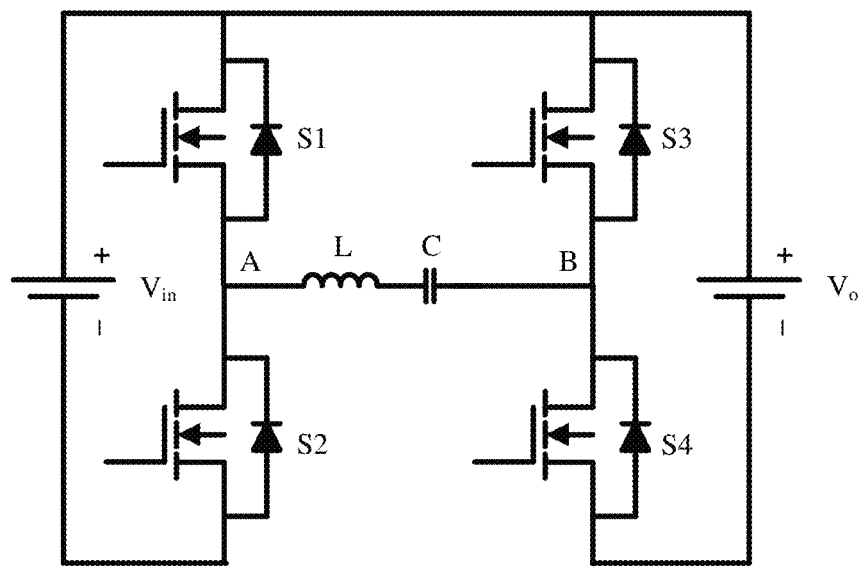
FIG. 4 is another circuit diagram of a non-isolated DCDC resonant conversion control circuit according to an embodiment of this application.

FIG. 4 is a circuit diagram of a non-isolated DCDC resonant conversion control circuit according to an embodiment of this application. In some embodiments, as shown in FIG. 4, a negative electrode of an input interface in the circuit is not coupled to a negative electrode of an output interface, and a positive electrode of the input interface is coupled to a positive electrode of the output interface. This embodiment of this application may be applicable to a case in which an input device and an output device share a same positive electrode. Similarly, an inductor L and a capacitor C are in a series resonant state. Another case of the circuit is similar to the embodiment corresponding to FIG. 3, and details are not described herein again.

Figure 5:
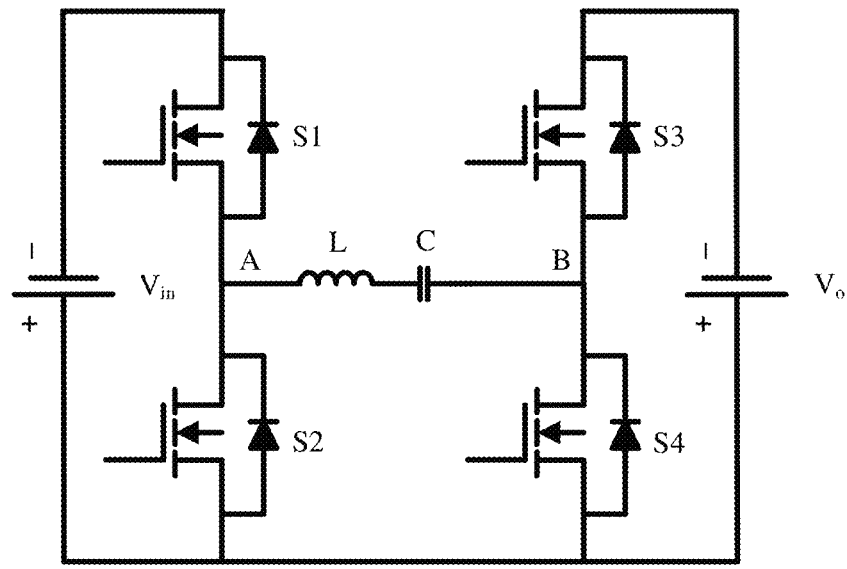
FIG. 5 is another circuit diagram of a non-isolated DCDC resonant conversion control circuit according to an embodiment of this application.

FIG. 5 is a circuit diagram of a non-isolated DCDC resonant conversion control circuit according to an embodiment of this application. In some embodiments, a positive electrode and a negative electrode of an input interface in the circuit in FIG. 5 are opposite to those in the circuit shown in FIG. 3, and a positive electrode and a negative electrode of an output interface are also opposite to those in the circuit shown in FIG. 3. In this case, the positive electrode of the input interface is coupled to the positive electrode of the output interface. Therefore, the embodiment corresponding to FIG. 5 may be applicable to a case in which an input device and an output device share a same positive electrode. Another case of the circuit is similar to the embodiment corresponding to FIG. 3, and details are not described herein again.

Figure 6:
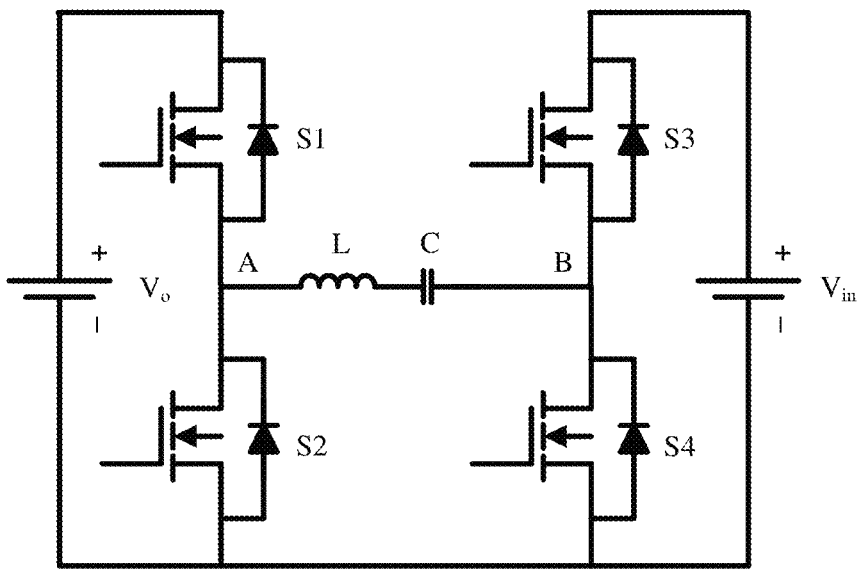
FIG. 6 is another circuit diagram of a non-isolated DCDC resonant conversion control circuit according to an embodiment of this application.

FIG. 6 is a circuit diagram of a non-isolated DCDC resonant conversion control circuit according to an embodiment of this application. In some embodiments, a position of an input interface in the circuit and a position of an output interface may be exchanged. To be specific, the output interface is coupled to a switching transistor S1 and a switching transistor S2 in series, and the input interface is coupled to a switching transistor S3 and a switching transistor S4 in series. In this embodiment of this application, the input interface may be connected to an input device such as a lithium battery, and the output interface may be connected to a direct-current device or the like. In actual application, a proper device may be connected based on a requirement, and this is not limited in this embodiment of this application.

The circuit of this embodiment of this application is a symmetrical bidirectional circuit. Therefore, a name of the input interface and a name of the output interface may be exchanged; in other words, the input interface may be renamed an output interface, and the output interface may be renamed an input interface. This does not affect implementation of this embodiment of this application. For ease of description, in this embodiment of this application, the position of the input interface and the position of the output interface in FIG. 3 are used for description. For another case (for example, the input interface and the output interface are exchanged), refer to this embodiment of this application for implementation. In some embodiments, the input interface may be connected to an input device, and may also be connected to an output device, and has both an input function and an output function. Therefore, the input interface may also be referred to as a first I/O interface. The output interface may be connected to an output device, and may also be connected to an input device, and has both an output function and an input function. Therefore, the output interface may also be referred to as a second I/O interface. When the input interface and the output interface are referred to as the first I/O interface and the second I/O interface, a circuit situation is similar to the embodiment corresponding to FIG. 3, and details are not described herein again.

The foregoing embodiments corresponding to FIG. 3, FIG. 4, FIG. 5, and FIG. 6 may be separately implemented or implemented in combination. For example, based on the circuit corresponding to FIG. 3, the position of the input interface and the position of the output interface are exchanged, and the positive electrode and the negative electrode of the input interface and the positive electrode and the negative electrode of the output interface are also exchanged.

In the foregoing embodiment, because the inductor L and the capacitor C are in a series resonant state, when the circuit works, a current waveform of the inductor L is similar to a sine wave. A waveform coefficient of the sine wave is small, and a conduction loss is low. Therefore, the circuit provided in this embodiment of this application can significantly reduce a circuit loss.

Based on the circuit corresponding to the foregoing embodiment, a non-isolated DCDC resonant conversion control method is provided in an embodiment of this application, to implement efficient DCDC conversion. For ease of description, the embodiment corresponding to FIG. 3 is described below. For another embodiment, refer to this embodiment of this application for implementation.

In this embodiment of this application, based on a conventional basic resonant half-bridge topology and based on the circuit corresponding to FIG. 3, a control method in which phase shifting and frequency adjustment are combined, namely, a non-isolated DCDC resonant conversion control method, is proposed, to implement efficient conversion.

Figure 7:
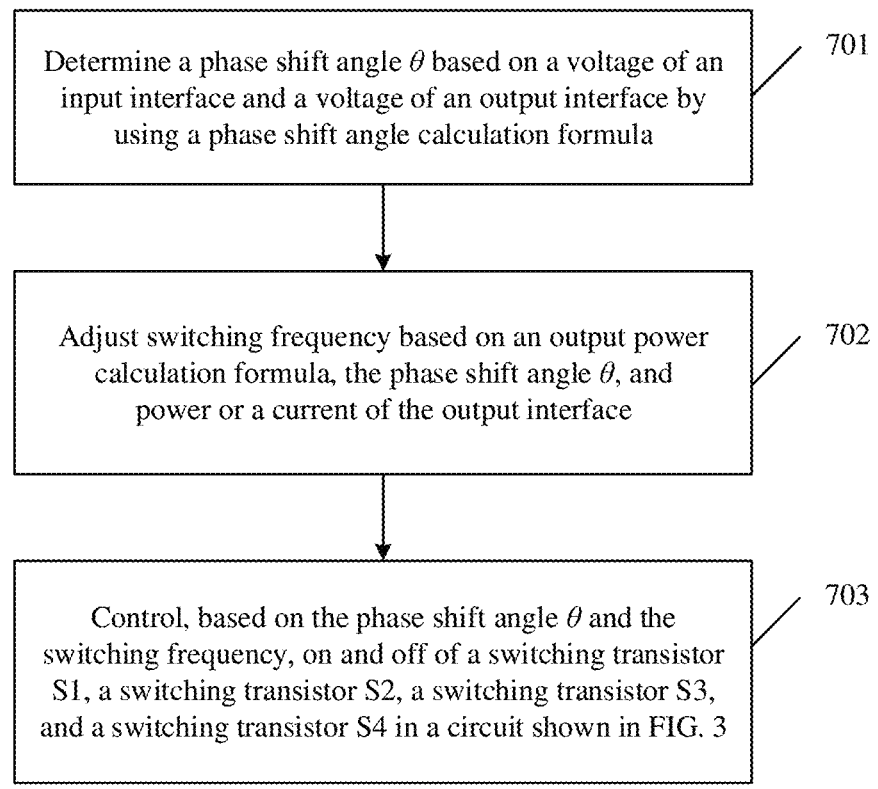
FIG. 7 is a flowchart of a non-isolated DCDC resonant conversion control method according to an embodiment of this application.

FIG. 7 is a flowchart of a non-isolated DCDC resonant conversion control method according to an embodiment of this application. The non-isolated DCDC resonant conversion control method includes the following steps.

701: Determine a phase shift angle θ based on a voltage of an input interface and a voltage of an output interface by using a phase shift angle calculation formula.

The phase shift angle calculation formula is:

$$\theta = \cos^{-1}\left(\frac{V_{out}}{V_{in}}\right) \text{ when } \frac{V_{out}}{V_{in}} \leq 1,$$

$$\text{and } \theta = \cos^{-1}\left(\frac{V_{in}}{V_{out}}\right) \text{ when } \frac{V_{in}}{V_{out}} \leq 1,$$

where $V_{in}$ is the voltage of the input interface, and $V_{out}$ is the voltage of the output interface.

In this embodiment of this application, a phase shift angle adjustment unit may be disposed to perform step 701. In this embodiment of this application, the voltage of the input interface and the voltage of the output interface are obtained based on an actual requirement. In some embodiments, the phase shift angle adjustment unit may be connected to the input interface and the output interface to obtain the voltage of the input interface and the voltage of the output interface.

For example, the input interface in the circuit is connected to a lithium battery, the output interface is connected to a fan, an output voltage of the lithium battery is 5 V, and the fan needs to be driven by a voltage of 12 V. In this case, it may be learned through calculation based on $V_{in}$=5 V, $V_{out}$=12 V, and the phase shift angle calculation formula that the phase shift angle θ is approximately equal to 65.38°.

For example, a mobile power pack includes a lithium battery and the circuit shown in FIG. 3. The input interface in the circuit is connected to the lithium battery, the output interface is connected to a mobile phone, and the mobile phone is charged by using the lithium battery. An output voltage of the lithium battery is 5 V, and the mobile phone needs fast charging of 9 V and 2 A, that is, 18 W. Therefore, the voltage of the lithium battery needs to be increased to 9 V by using the circuit shown in FIG. 3. In this case, it may be learned through calculation based on $V_{in}$=5 V, $V_{out}$=9 V, and the phase shift angle calculation formula that the phase shift angle θ is approximately equal to 56.25°.

A manner of determining the phase shift angle θ by using the phase shift angle calculation formula may be: directly obtaining the phase shift angle θ through calculation based on the phase shift angle calculation formula, the voltage of the input interface, and the voltage of the output interface; or constantly adjusting the phase shift angle θ based on the phase shift angle calculation formula and the voltage of the input interface, and calculating the voltage of the output interface in real time until the voltage of the output interface reaches a required value.

For example, in some embodiments, the control method may have an auto-adaptive adjustment mode. The auto-adaptive adjustment mode is specifically: When the voltage of the input interface is determined, a required target voltage value of the output interface is set, and the phase shift angle θ is automatically increased or decreased, and the voltage of the output interface is continuously calculated in real time in a process of adjusting the phase shift angle θ. When the calculated voltage of the output interface reaches the target voltage value of the output interface (or the voltage of the output interface reaches a threshold range close to the target voltage value of the output interface), a current value of the phase shift angle θ is determined. For example, the input interface in the circuit is connected to a lithium battery, the output interface is connected to a fan, an output voltage of the lithium battery is 5 V, and the fan needs to be driven by a voltage of 12 V. When $V_{in}$=5 V, the phase shift angle θ is constantly adjusted, and the voltage of the output interface is calculated in real time based on the phase shift angle calculation formula. When the voltage of the output interface reaches 12 V (or 12±0.5 V), the current value of the phase shift angle θ is determined.

In some embodiments, when the voltage of the input interface is determined, a required target voltage value of the output interface is set, the phase shift angle θ is automatically increased or decreased, and on/off of the switching transistors S1 to S4 is controlled based on the phase shift angle θ (another circuit parameter may be default), and the voltage of the output interface is continuously detected by a voltage detection module in real time in a process of adjusting the phase shift angle θ. When the detected voltage of the output interface reaches the target voltage value of the output interface (or the voltage of the output interface reaches a threshold range close to the target voltage value of the output interface), a current value of the phase shift angle θ is determined.

In this embodiment of this application, the phase shift angle θ may be a phase difference of a voltage between the input interface and the output interface. For ease of understanding, in this embodiment of this application, fundamental wave analysis is performed on the circuit in FIG. 3, to obtain a circuit equivalent model shown in FIG. 8 and a vector diagram shown in FIG. 9.

Figure 8:
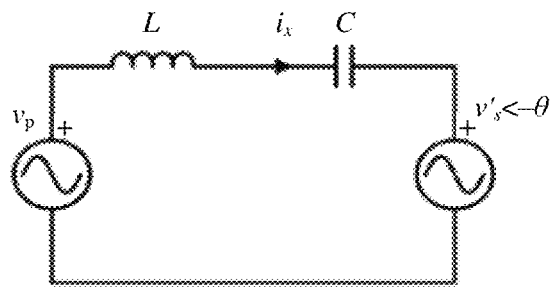
FIG. 8 is a diagram of a circuit equivalent model of fundamental wave analysis of the circuit corresponding to FIG. 3 according to an embodiment of this application.
Figure 9:
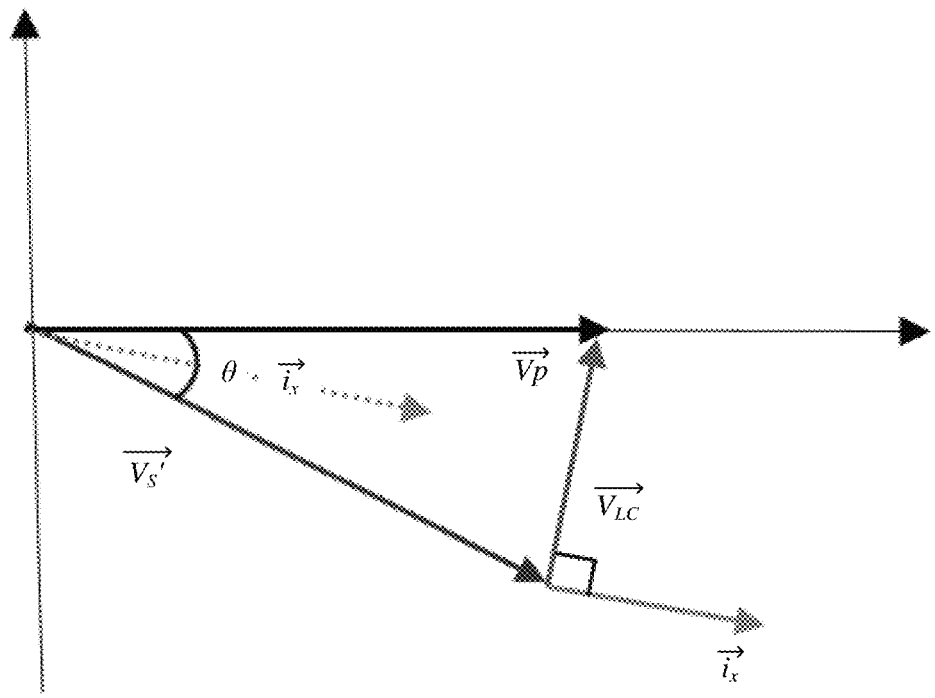
FIG. 9 is a vector diagram corresponding to FIG. 8 according to an embodiment of this application.

FIG. 8 is a diagram of a circuit equivalent model of fundamental wave analysis of the circuit corresponding to FIG. 3 according to an embodiment of this application. FIG. 9 is a vector diagram corresponding to FIG. 8 according to an embodiment of this application. $V_p$ is an equivalent fundamental wave of an input voltage, $V_{s'}$ is an equivalent fundamental wave of an output voltage, and $i_x$ is an equivalent fundamental wave of a resonant cavity current. A minimum effective current value may be obtained by using a phase shift angle that meets the phase shift angle calculation formula, so that a phase of the resonant cavity current $i_x$ shown in FIG. 9 is between a voltage phase of $V_p$ and a voltage phase of $V_{s'}$. Therefore, the phase shift angle θ may be adjusted, so that the phase of the resonant cavity current is between the voltage phase of $V_p$ and the voltage phase of $V_{s'}$. In this way, zero voltage switching (ZVS) or zero current switching (ZCS) of the switching transistor S1, the switching transistor S2, the switching transistor S3, and the switching transistor S4 is implemented. Both the ZVS and the ZCS are soft switching, and mean that a semiconductor switch component implements zero voltage switching on or zero current switching off. In this case, a switching loss is low. Oscillation excited in a switching process can also be reduced, so that switching frequency can be greatly increased, facilitating miniaturization and modularization of a DCDC converter.

Therefore, in this embodiment of this application, a phase shift angle θ that can implement full-range ZVS may be first selected based on the voltage of the input interface and the voltage of the output interface, to ensure that the switching transistor S1, the switching transistor S2, the switching transistor S3, and the switching transistor S4 can implement full-power-range ZVS.

702: Adjust switching frequency based on an x calculation formula, the phase shift angle θ, and power or a current of the output interface.

The output power calculation formula is:

$$P_o = \frac{2 * V_{in} * V_{out}}{\pi^2 * \left(2\pi f_s * L - \dfrac{1}{2\pi f_s * C}\right)} * \sin\theta,$$

where $P_0$ is the power of the output interface, $V_{in}$ is the voltage of the input interface, $V_{out}$ is the voltage of the output interface, $f_s$ is the switching frequency, L is an inductance value of an inductor, C is a capacitance value of a capacitor, and θ is the phase shift angle of the voltage between the input interface and the output interface.

In this embodiment of this application, a frequency adjustment unit may be disposed to perform step 702. In some embodiments, the frequency adjustment unit may be connected to a phase shift angle adjustment unit to obtain parameters such as the phase shift angle, the voltage of the input interface, and the voltage of the output interface. After calculating the switching frequency, the frequency adjustment unit may send the switching frequency and the phase shift angle to a control unit.

In this embodiment of this application, after the phase shift angle θ is obtained through calculation, other parameters (parameters other than the power of the output interface and the switching frequency) in the output power calculation formula are determined, and the frequency adjustment unit may directly calculate the switching frequency based on required target power of the output interface and the output power calculation formula. In this embodiment of this application, the switching frequency may be a quantity of switching times of the switching transistor S1, the switching transistor S2, the switching transistor S3, or the switching transistor S4 in one period. In this embodiment of this application, the switching transistor S1, the switching transistor S2, the switching transistor S3, and the switching transistor S4 may have same switching frequency.

In some embodiments, after the phase shift angle θ has been obtained through calculation, the frequency adjustment unit may adjust the switching frequency, and calculate the power of the output interface in real time based on the output power calculation formula. When the power of the output interface reaches a required target value (or within a threshold range close to the target value), a current value of the switching frequency is determined.

In some embodiments, after the phase shift angle θ has been obtained through calculation, the frequency adjustment unit may adjust the switching frequency, control, by using the control unit, on and off of the switching transistor S1, the switching transistor S2, the switching transistor S3, and the switching transistor S4 based on parameters such as the switching frequency and the phase shift angle that are obtained after adjustment, detect, in real time, the voltage and the current of the output interface by using a voltage detection module and a current detection module, and calculate the power of the output interface based on the detected voltage and the detected current. In some other embodiments, the power of the output interface may alternatively be directly detected by a power sensor. When the power of the output interface reaches a required target value (or within a threshold range close to the target value), a current value of the switching frequency is determined.

In some embodiments, after the switching frequency is determined, when required output power changes (for example, a plurality of working gears are set for a load, and different power is required at different working gears), the frequency adjustment unit may adjust the switching frequency again, so that the power of the output interface reaches the required output power again. For example, when the required output power changes to second target output power, the frequency adjustment unit may adjust the switching frequency based on the phase shift angle θ and second target output power of the output interface until the power of the output interface reaches the second target output power. An adjustment method is similar to that in the foregoing embodiment. Similarly, when a required output current changes, similar adjustment may also be performed.

In some embodiments, in the control method, the switching frequency may be determined by using the current of the output interface and the output power calculation formula. Specifically, in the control method, the power of the output interface is calculated based on the current of the output interface and the voltage of the output interface. After the power of the output interface is obtained, in the control method, switching frequency of the switching transistor S1, switching frequency of the switching transistor S2, switching frequency of the switching transistor S3, and switching frequency of the switching transistor S4 may be determined based on the power of the output interface and the output power calculation formula. This is similar to that in the foregoing embodiment, and details are not described herein again.

In some embodiments, step 701 and step 702 have no sequential relationship; in other words, the phase shift angle and the switching frequency may be adjusted simultaneously, so that both the voltage and the power of the output interface reach required values. A manner of determining the phase shift angle and the switching frequency may be: directly performing calculation by using a formula; may be: calculating the voltage and the power of the output interface in real time by adjusting the phase shift angle and the switching frequency, until both the voltage and the power of the output interface reach the required values; or may be: monitoring the voltage and the power of the output interface in real time by adjusting the phase shift angle and the switching frequency, until the voltage and the power of the output interface reach the required values.

In the control method provided in this embodiment of this application, not only the phase shift angle can be adjusted, but the switching frequency can also be adjusted. Therefore, ranges in which the voltage and the power of the output interface can be adjusted are large; in other words, a gain adjustment range of the non-isolated DCDC circuit is large, so that non-isolated wide-range DCDC resonant conversion is implemented.

703: Control, based on the phase shift angle θ and the switching frequency, on and off of the switching transistor S1, the switching transistor S2, the switching transistor S3, and the switching transistor S4 in the circuit shown in FIG. 3.

In the control method provided in this embodiment of this application, step 701 and step 702 may be performed by a determining module to obtain the phase shift angle θ and the switching frequency. Then, the determining module sends the phase shift angle θ and the switching frequency to the control unit, so that the control unit controls, based on the phase shift angle θ and the switching frequency, on and off of the switching transistor S1, the switching transistor S2, the switching transistor S3, and the switching transistor S4 in the circuit shown in FIG. 3. In some cases, a voltage detection unit, a current detection unit, and a power detection unit may be disposed for the determining module, to detect the voltage, the current, and the power of the output interface.

In some other embodiments, the control unit may directly perform step 701 and step 702 to obtain the phase shift angle θ and the switching frequency, and then directly control, based on the phase shift angle θ and the switching frequency, on and off of the switching transistor S1, the switching transistor S2, the switching transistor S3, and the switching transistor S4 in the circuit shown in FIG. 3. In some cases, a voltage detection unit, a current detection unit, and a power detection unit may be disposed for the control unit, to detect the voltage, the current, and the power of the output interface.

In this embodiment of this application, the control unit is a circuit component connecting the switching transistor S1, the switching transistor S2, the switching transistor S3, and the switching transistor S4, and may control on and off of the switching transistor S1, the switching transistor S2, the switching transistor S3, and the switching transistor S4 by using a drive signal. For example, in the drive signal, a high level is used to turn on the switching transistor, and a low level is used to turn off the switching transistor. When a voltage of a connection line connecting the control unit and the switching transistor S1 becomes a high level, the switching transistor S1 is on. When the voltage of the connection line connecting the control unit and the switching transistor S1 becomes a low level, the switching transistor S1 is off. In actual application, the control unit may alternatively control on and off of the switching transistor S1, the switching transistor S2, the switching transistor S3, and the switching transistor S4 in another manner. This is not limited in this embodiment of this application.

The control unit controls, based on the phase shift angle θ and the switching frequency, on and off of the switching transistor S1, the switching transistor S2, the switching transistor S3, and the switching transistor S4 in the circuit shown in FIG. 3. A process is shown in FIG. 10a, FIG. 10b, FIG. 10c, FIG. 10d, FIG. 10e, and FIG. 10f.

Figure 10A:
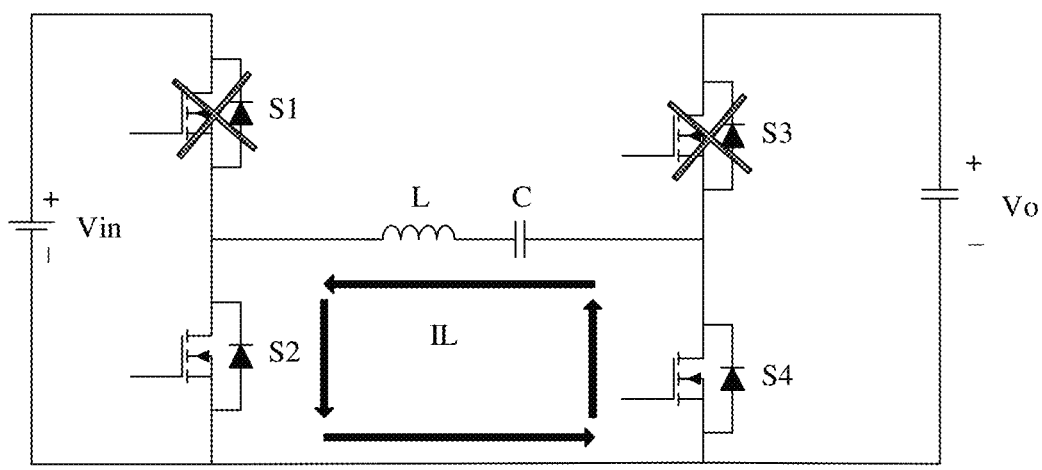
FIG. 10a is a schematic diagram of a working principle of a non-isolated DCDC resonant conversion control circuit according to an embodiment of this application.

FIG. 10a is a schematic diagram of a working principle of a non-isolated DCDC resonant conversion control circuit according to an embodiment of this application. An initial state of the non-isolated DCDC resonant conversion control circuit shown in FIG. 3 in embodiments of this application is shown in FIG. 10a. The switching transistor S2 and the switching transistor S4 are on, and a resonant cavity current flows in a clockwise direction.

Figure 10B:
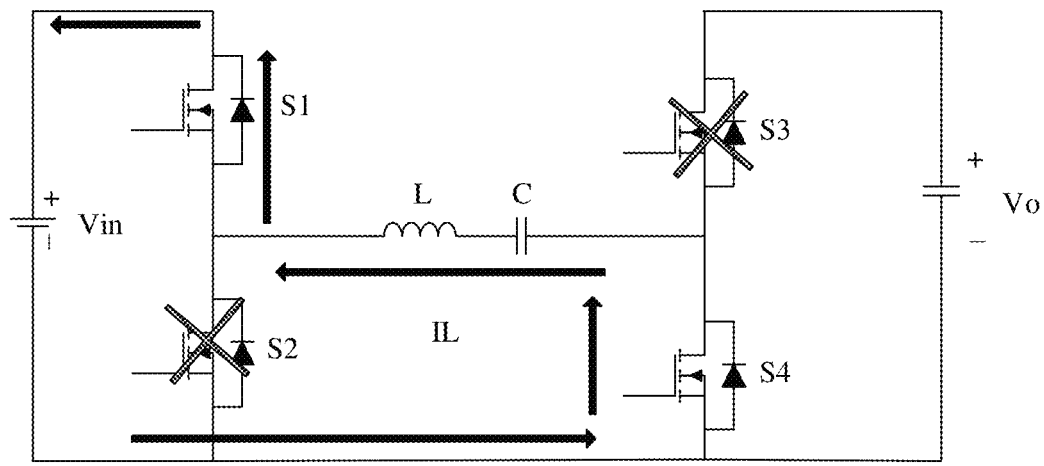
FIG. 10b is another schematic diagram of a working principle of a non-isolated DCDC resonant conversion control circuit according to an embodiment of this application.

FIG. 10b is a schematic diagram of a working principle of a non-isolated DCDC resonant conversion control circuit according to an embodiment of this application. Based on the circuit shown in FIG. 10a, if the control unit controls the switching transistor S2 to be off, a diode that is anti-parallel connected to the switching transistor S1 is on. In this case, the control unit controls the switching transistor S1 to be on, so that the switching transistor S1 can implement ZVS on, as shown in FIG. 10b.

Figure 10C:
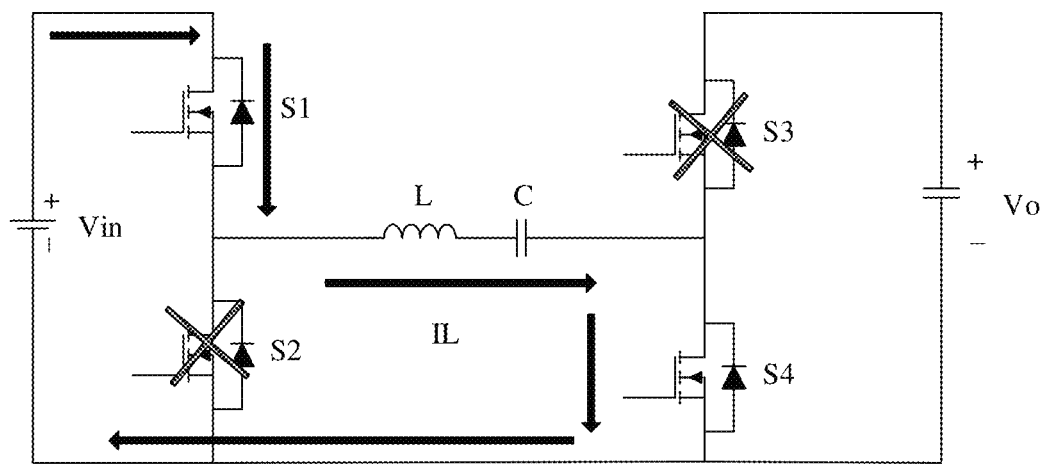
FIG. 10c is another schematic diagram of a working principle of a non-isolated DCDC resonant conversion control circuit according to an embodiment of this application.

FIG. 10c is a schematic diagram of a working principle of a non-isolated DCDC resonant conversion control circuit according to an embodiment of this application. Based on the circuit shown in FIG. 10b, after the switching transistor S1 implements ZVS on, the resonant cavity current flows in a clockwise direction, and a current of a positive electrode of the input interface sequentially flows to the switching transistor S1, the inductor L, the capacitor C, and the switching transistor S4, and then flows back to a negative electrode of the input interface, as shown in FIG. 10c.

Figure 10D:
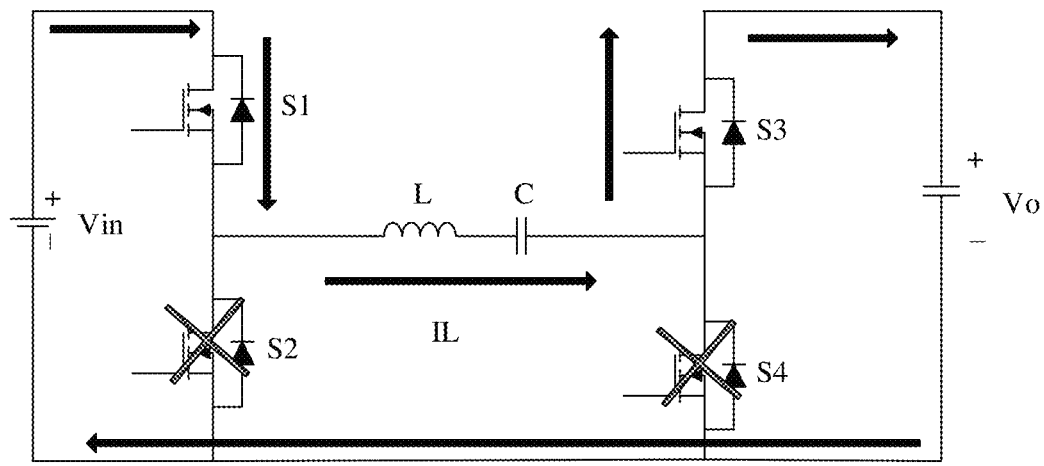
FIG. 10d is another schematic diagram of a working principle of a non-isolated DCDC resonant conversion control circuit according to an embodiment of this application.

FIG. 10d is a schematic diagram of a working principle of a non-isolated DCDC resonant conversion control circuit according to an embodiment of this application. Based on the circuit shown in FIG. 10c, if the control unit controls the switching transistor S4 to be off, a diode that is anti-parallel connected to the switching transistor S3 is on. In this case, the control unit controls the switching transistor S3 to be on, so that the switching transistor S3 can implement ZVS on, as shown in FIG. 10d.

Figure 10E:
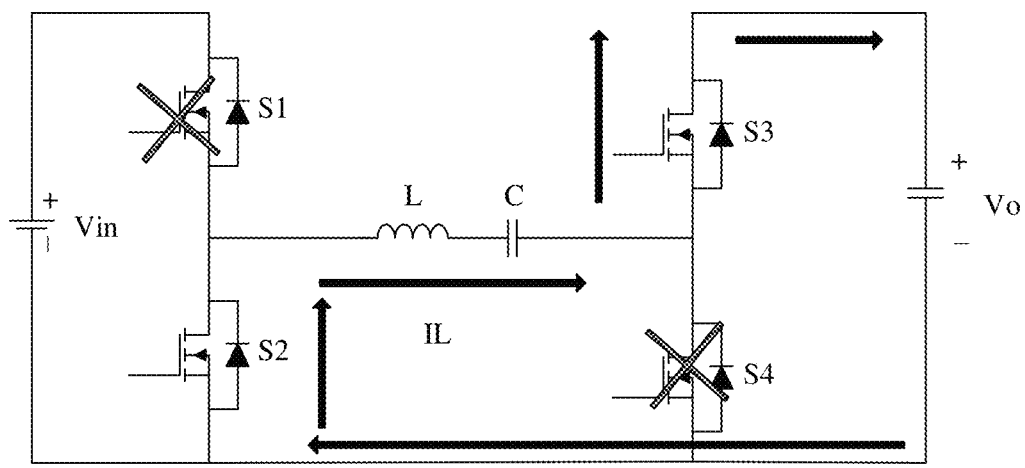
FIG. 10e is another schematic diagram of a working principle of a non-isolated DCDC resonant conversion control circuit according to an embodiment of this application.

FIG. 10e is a schematic diagram of a working principle of a non-isolated DCDC resonant conversion control circuit according to an embodiment of this application. Based on the circuit shown in FIG. 10d, if the control unit controls the switching transistor S1 to be off, a diode that is anti-parallel connected to the switching transistor S2 is on. In this case, the control unit controls the switching transistor S2 to be on, so that the switching transistor S2 can implement ZVS on, as shown in FIG. 10e.

Figure 10F:
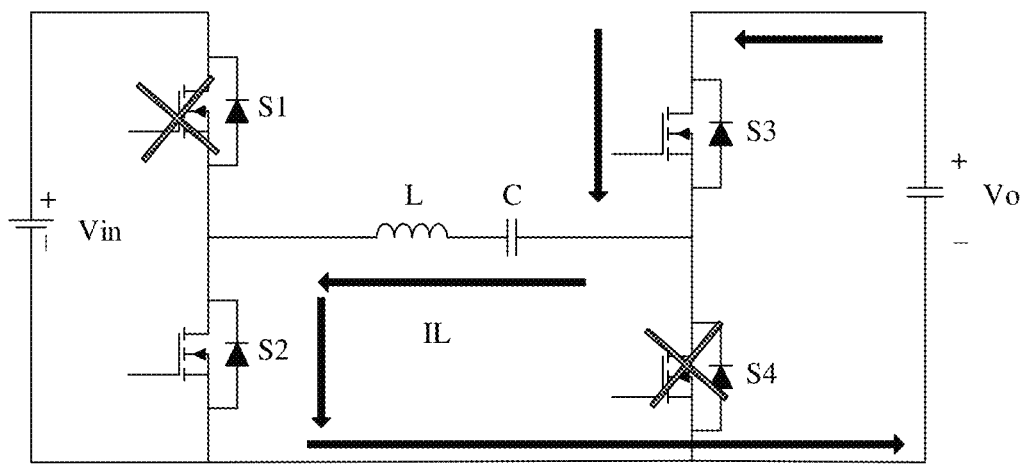
FIG. 10f is another schematic diagram of a working principle of a non-isolated DCDC resonant conversion control circuit according to an embodiment of this application.

FIG. 10f is a schematic diagram of a working principle of a non-isolated DCDC resonant conversion control circuit according to an embodiment of this application. Based on the circuit shown in FIG. 10e, after the switching transistor S2 implements ZVS on, the resonant cavity current flows in an anticlockwise direction, as shown in FIG. 10f.

Based on the circuit shown in FIG. 10f, if the control unit controls the switching transistor S3 to be off, a diode that is anti-parallel connected to the switching transistor S4 is on. In this case, the control unit controls the switching transistor S4 to be on, so that the switching transistor S4 can implement ZVS on, as shown in FIG. 10a.

In this embodiment of this application, when the control unit controls the switching transistor S1 to be on, the control unit controls the switching transistor S2 to be off; when the control unit controls the switching transistor S1 to be off, the control unit controls the switching transistor S2 to be on; when the control unit controls the switching transistor S3 to be on, the control unit controls the switching transistor S4 to be off; and when the control unit controls the switching transistor S3 to be off, the control unit controls the switching transistor S4 to be on.

In the foregoing processes shown in FIG. 10a, FIG. 10b, FIG. 10c, FIG. 10d, FIG. 10e, and FIG. 10f, the control unit controls the switching transistor S1, the switching transistor S2, the switching transistor S3, and the switching transistor S4 to be continuously on and off. In one period, a quantity of turn-on times and a quantity of turn-off times of the switching transistor S1 are referred to as switching frequency of the switching transistor S1. In this embodiment of this application, the switching transistor S1, the switching transistor S2, the switching transistor S3, and the switching transistor S4 may have same switching frequency. For example, time used by the processes shown in FIG. 10a, FIG. 10b, FIG. 10c, FIG. 10d, FIG. 10e, and FIG. 10f is 1 millisecond, the switching frequency of the switching transistor S1 is twice/millisecond, where one time is the quantity of turn-on times, and the other time is the quantity of turn-off times. If the switching frequency obtained by the control unit is once/millisecond, the control unit may reduce an on/off rate of the switching transistor, to prolong the time used by the processes shown in FIG. 10a, FIG. 10b, FIG. 10c, FIG. 10d, FIG. 10e, and FIG. 10f, so that the used time is prolonged to two milliseconds, and the switching frequency of the switching transistor S1 changes to once/millisecond.

Figure 11:
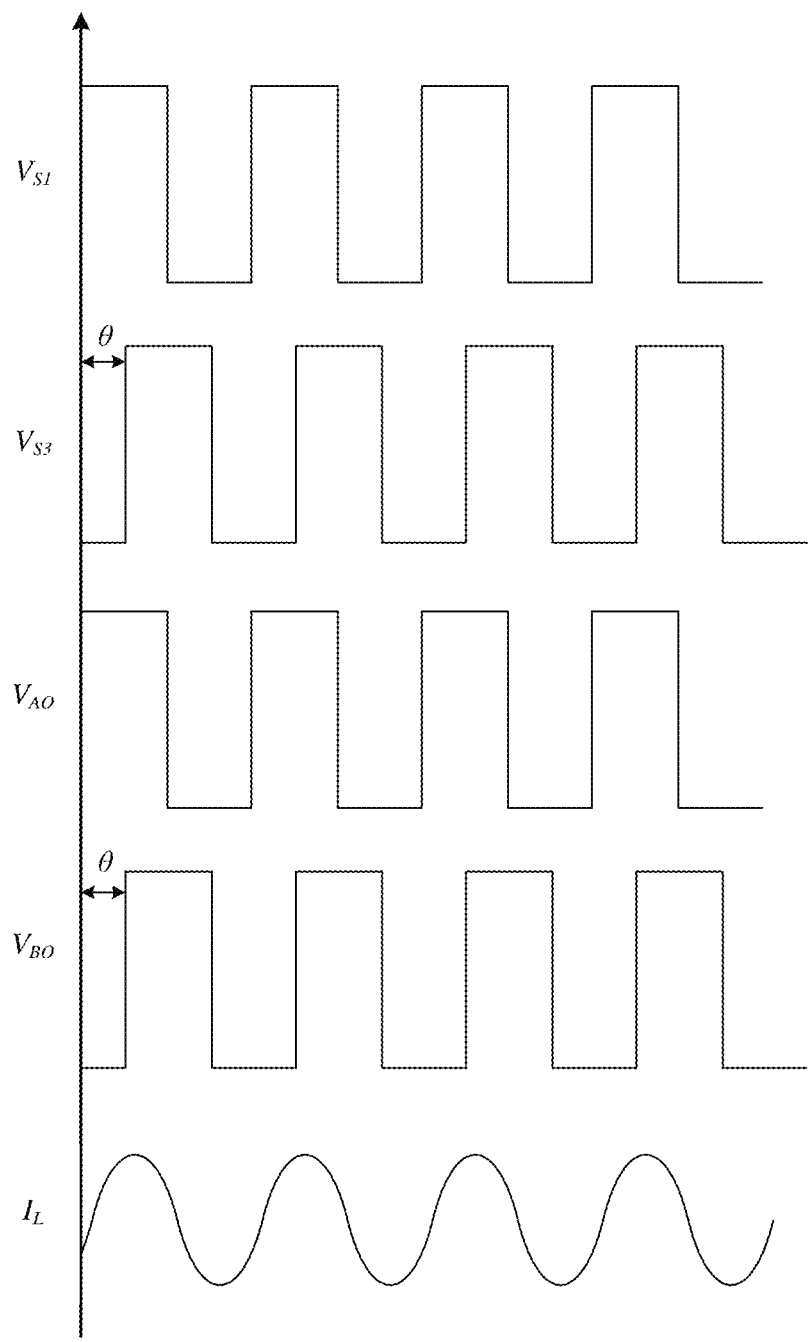
FIG. 11 is a diagram of a working waveform of the circuit shown in FIG. 3 according to an embodiment of this application.

In the foregoing processes shown in FIG. 10a, FIG. 10b, FIG. 10c, FIG. 10d, FIG. 10e, and FIG. 10f, a moment at which the control unit controls the switching transistor S3 to be on is later than a moment at which the switching transistor S1 is controlled to be on. Specifically, delayed time may be determined based on the phase shift angle θ. FIG. 11 is a diagram of a working waveform of the circuit shown in FIG. 3 according to an embodiment of this application. $V_{S1}$ is a voltage of a drive signal of the switch transistor S1, $V_{S3}$ is a voltage of a drive signal of the switching transistor S3, and $V_{S1}$ and $V_{S3}$ are complementary signals. $V_{AO}$ is a voltage from an end A to an end O, and $V_{BO}$ is a voltage from an end B to the end O. It can be learned that an on angle (that is, the phase shift angle θ) by which the switching transistor S3 is later than the switching transistor S1 is θ. Therefore, the control unit may control, based on the obtained phase shift angle θ, the moment at which the switching transistor S3 is on to be later than the moment at which the switching transistor S1 is controlled to be on.

As shown in FIG. 11, a current $I_L$ flowing through the inductor L is a sine waveform, and a waveform coefficient of a sine wave is small, and a conduction loss of the sine wave is low. Therefore, the circuit provided in this embodiment of this application can significantly reduce a circuit loss.

Figure 12:
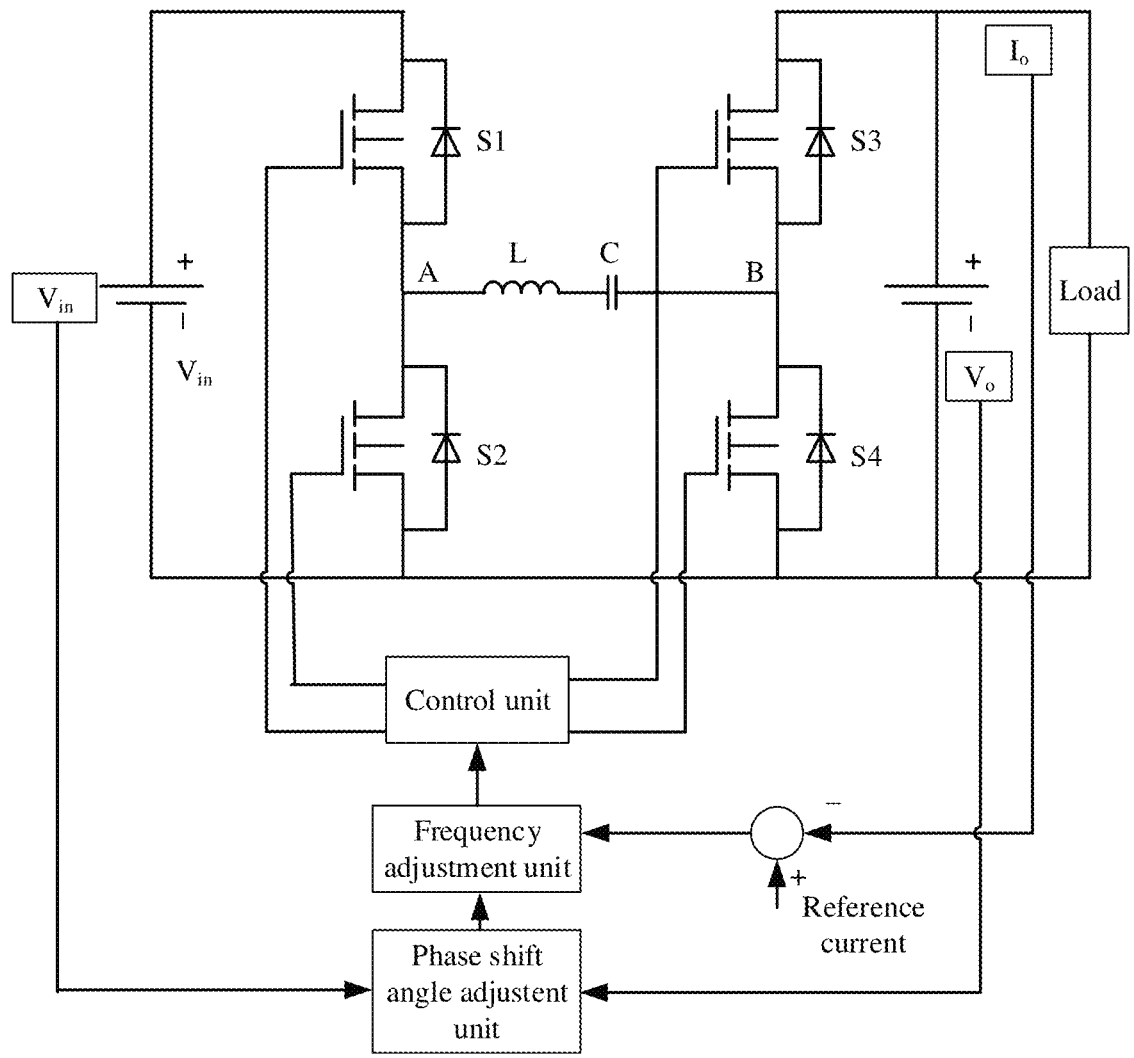
FIG. 12 is a schematic diagram of a control policy for the circuit in FIG. 3 according to an embodiment of this application.

FIG. 12 is a schematic diagram of a control policy for the circuit in FIG. 3 according to an embodiment of this application. It can be learned that, in this embodiment of this application, after the voltage of the input interface and the voltage of the output interface are obtained, a proper phase shift angle may be determined. Then, the switching frequency of the switching transistor S1, the switching frequency of the switching transistor S2, the switching frequency of the switching transistor S3, and the switching frequency of the switching transistor S4 are determined based on the phase shift angle and the power or the current of the output interface. Finally, on and off of the switching transistor S1, the switching transistor S2, the switching transistor S3, and the switching transistor S4 are controlled based on the determined phase shift angle and the determined switching frequency. Specifically, the phase shift angle adjustment unit, the frequency adjustment unit, and the control unit may be used for implementation. It can be learned from FIG. 12 that, the control unit is connected to the switching transistor S1, the switching transistor S2, the switching transistor S3, and the switching transistor S4, and may control on and off of the switching transistor S1, the switching transistor S2, the switching transistor S3, and the switching transistor S4 by using a drive signal. The phase shift angle adjustment unit is connected to the input interface and the output interface, and is configured to: determine the phase shift angle θ based on the voltage of the input interface and the voltage of the output interface by using the phase shift angle calculation formula, and then send parameters such as an input voltage, an output voltage, and the phase shift angle θ to the frequency adjustment unit. The frequency adjustment unit is connected to the output interface and the phase shift angle adjustment unit, and is configured to: adjust the switching frequency based on the output power calculation formula, the phase shift angle θ, and the power or the current of the output interface, and then send the phase shift angle θ and the switching frequency to the control unit. In some cases, as shown in FIG. 12, a reference current is coupled and input between the frequency adjustment unit and the output interface, and is used as a current inner loop to perform loop control, to ensure system stability.

Figure 13:
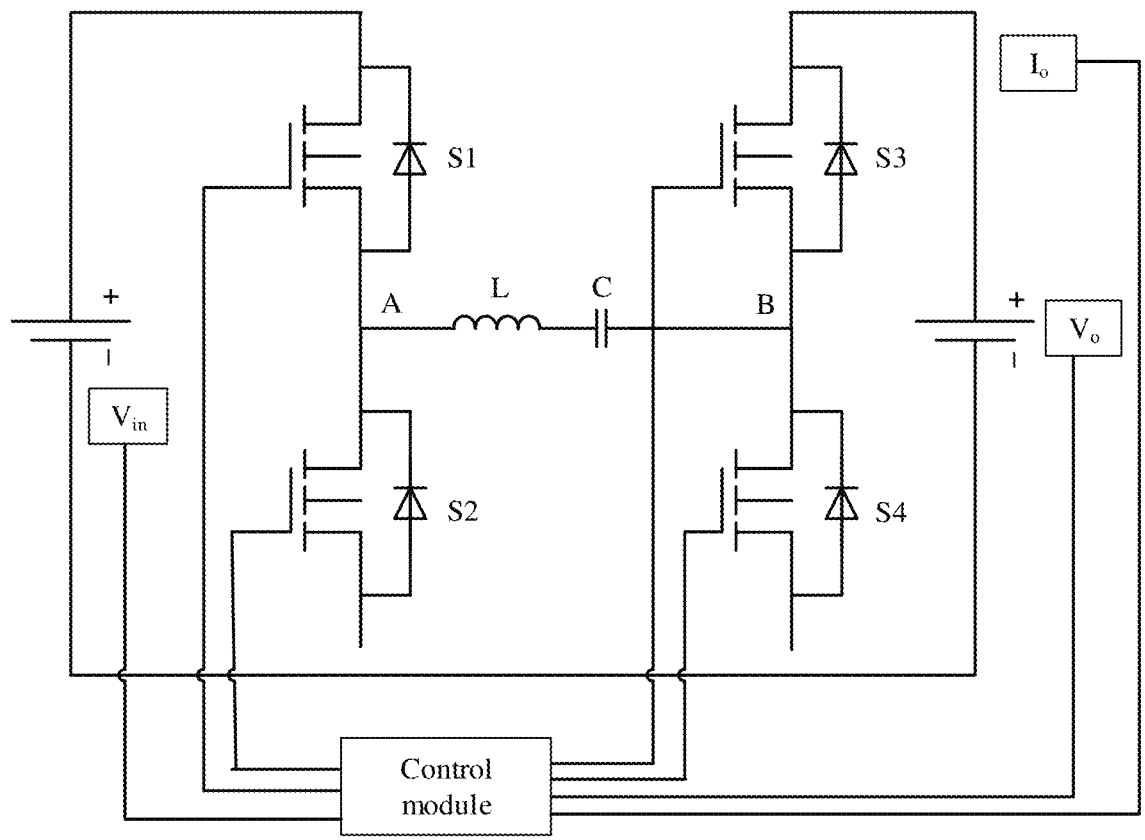
FIG. 13 is a schematic diagram of a circuit including a control module according to an embodiment of this application.

In some embodiments, the phase shift angle adjustment unit, the frequency adjustment unit, and the control unit may be combined into one control module to comprehensively perform functions of the foregoing units, as shown in FIG. 13. FIG. 13 is a schematic diagram of a circuit including a control module according to an embodiment of this application.

Figure 14:
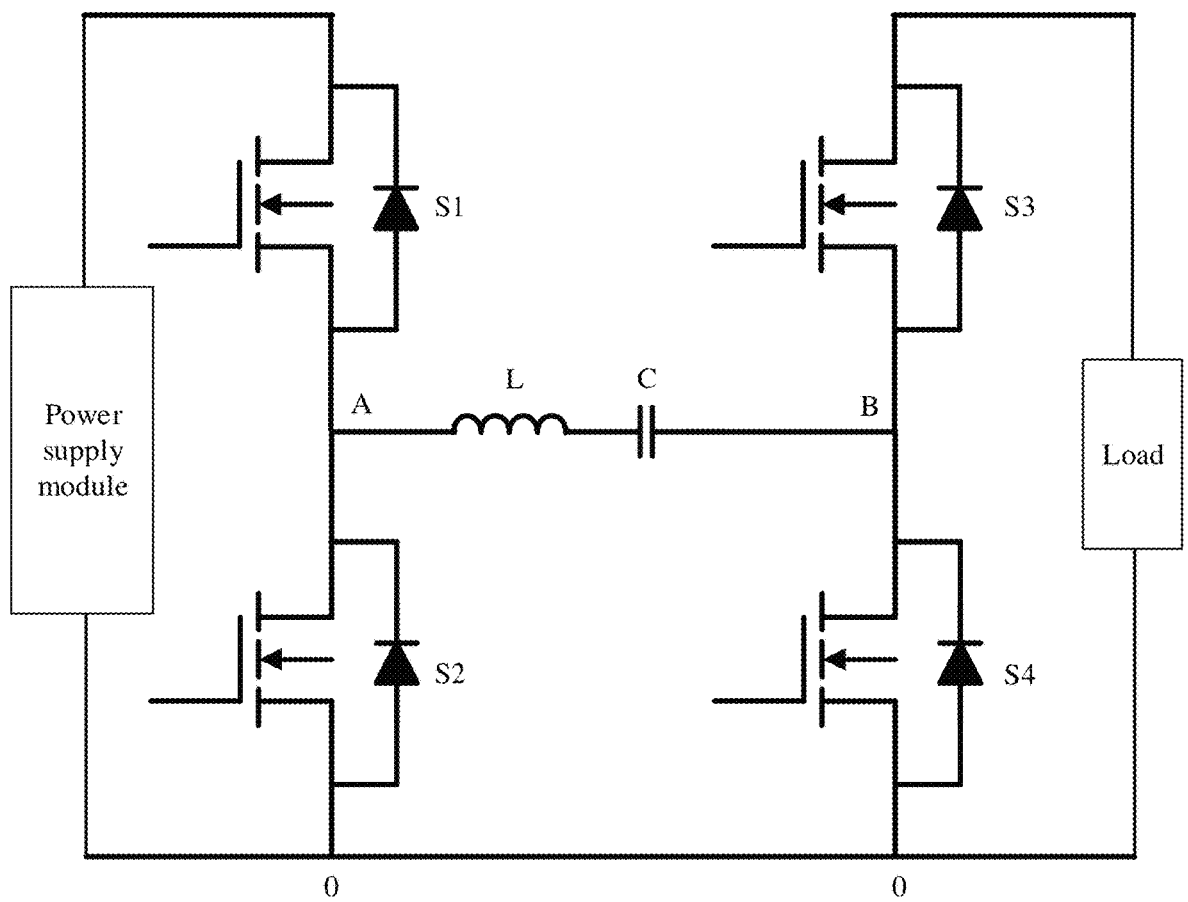
FIG. 14 is a schematic diagram of a power supply system according to an embodiment of this application.

FIG. 14 is a schematic diagram of a power supply system according to an embodiment of this application. The power supply system specifically includes a power supply module and the non-isolated DCDC resonant conversion control circuit in any one of the foregoing embodiments. An output end of the power module is connected to an input interface in the non-isolated DCDC resonant conversion control circuit. An output interface in the non-isolated DCDC resonant conversion control circuit is connected to a load. For example, if an output voltage of the power module is 9 V, and a voltage required by the load is 12 V, the non-isolated DCDC resonant conversion control circuit may be adjusted, so that an output voltage of the output interface in the non-isolated DCDC resonant conversion control circuit is 12 V, to meet a requirement of the load. In some embodiments, the power supply module is specifically a lithium battery, and has advantages of relatively high energy, a long service life, and being environmental friendly. In some embodiments, the power supply module is specifically a photovoltaic power supply.

This embodiment of this application is mainly applied to an application scenario in which there is a non-isolated DCDC conversion requirement, such as lithium battery DCDC conversion, battery DCDC conversion, or photovoltaic front-stage DCDC conversion, and may be used as a DCDC conversion power supply. An application scenario is not limited in this embodiment of this application.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The invention claimed is:

1. A non-isolated DC-DC resonant conversion control circuit, comprising an input interface, a first switching transistor, a second switching transistor, a third switching transistor, a fourth switching transistor, an inductor, a capacitor, and an output interface, wherein
the first switching transistor and the second switching transistor, that are connected in series with each other, are coupled to the input interface in series;
the third switching transistor and the fourth switching transistor, that are connected in series with each other, are coupled to the output interface in series;
the inductor and the capacitor, that are connected in series with each other, are coupled between an end A that is a node on which the first switching transistor and the second switching transistor are connected in series and an end B that is a node on which the third switching transistor and the fourth switching transistor are connected in series; and
a negative electrode of the input interface is coupled to a negative electrode of the output interface, or a positive electrode of the input interface is coupled to a positive electrode of the output interface, wherein:
a phase shift angle θ of a voltage between the input interface and the output interface satisfies $$\theta = \cos^{-1}\left(\frac{V_{out}}{V_{in}}\right) \text{ when } \frac{V_{out}}{V_{in}} \leq 1,$$

$$\text{and } \theta = \cos^{-1}\left(\frac{V_{in}}{V_{out}}\right) \text{ when } \frac{V_{in}}{V_{out}} \leq 1,$$

$V_{in}$ is a voltage of the input interface, and $V_{out}$ is a voltage of the output interface; and/or
output power $P_0$ of the output interface is $$P_o = \frac{2 * V_{in} * V_{out}}{\pi^2 * \left(2\pi f_s * L - \frac{1}{2\pi f_s * C}\right)} * \sin\theta,$$

$V_{in}$ is the voltage of the input interface, $V_{out}$ is the voltage of the output interface, $f_s$ is a switching frequency, L is an inductance value of the inductor, and C is a capacitance value of the capacitor.

2. The non-isolated DC-DC resonant conversion control circuit according to claim 1, wherein the phase shift angle θ of the voltage between the input interface and the output interface satisfies:

$$\theta = \cos^{-1}\left(\frac{V_{out}}{V_{in}}\right) \text{ when } \frac{V_{out}}{V_{in}} \leq 1, \text{ and}$$

$$\theta = \cos^{-1}\left(\frac{V_{in}}{V_{out}}\right) \text{ when } \frac{V_{in}}{V_{out}} \leq 1, \text{ wherein}$$

$V_{in}$ is the voltage of the input interface, and $V_{out}$ is the voltage of the output interface.

3. The non-isolated DC-DC resonant conversion control circuit according to claim 1, wherein the output power $P_0$ of the output interface is:

$$P_o = \frac{2 * V_{in} * V_{out}}{\pi^2 * \left(2\pi f_s * L - \frac{1}{2\pi f_s * C}\right)} * \sin\theta,$$

wherein
$V_{in}$ is the voltage of the input interface, $V_{out}$ is the voltage of the output interface, $f_s$ is the switching frequency, L is the inductance value of the inductor, C is a capacitance value of the capacitor, and θ is the phase shift angle of the voltage between the input interface and the output interface.

4. The non-isolated DC-DC resonant conversion control circuit according to claim 1, wherein
when the first switching transistor is on, the second switching transistor is off;
when the first switching transistor is off, the second switching transistor is on;
when the third switching transistor is on, the fourth switching transistor is off; and
when the third switching transistor is off, the fourth switching transistor is on.

5. The non-isolated DC-DC resonant conversion control circuit according to claim 1, further comprising a control unit, wherein the control unit is coupled to the first switching transistor, the second switching transistor, the third switching transistor, and the fourth switching transistor, and is configured to control setting on and off of the first switching transistor, the second switching transistor, the third switching transistor, and the fourth switching transistor.

6. The non-isolated DC-DC resonant conversion control circuit according to claim 1, further comprising a phase shift angle adjustment unit configured to determine the phase shift angle θ of the voltage between the input interface and the output interface based on the voltage of the input interface and a target voltage of the output interface.

7. The non-isolated DC-DC resonant conversion control circuit according to claim 1, further comprising a frequency adjustment unit configured to determine a switching frequency of the first switching transistor in the control circuit based on the phase shift angle θ and a first target power or a first target current of the output interface.

8. The non-isolated DC-DC resonant conversion control circuit according to claim 7, wherein
the frequency adjustment unit is further configured to adjust the switching frequency based on the phase shift angle θ and a second target power or a second target current of the output interface.

9. A power supply system, comprising a power supply module and the non-isolated DC-DC resonant conversion control circuit according to claim 1, wherein
the power supply module is connected to the input interface of the non-isolated DC-DC resonant conversion control circuit.

10. The power supply system according to claim 9, wherein the power supply module is a lithium battery or a photovoltaic power supply.

11. A non-isolated DC-DC resonant conversion control method comprising:
determining a phase shift angle θ of a voltage between an input interface and an output interface of a control circuit based on a voltage of the input interface and a target voltage of the output interface;
determining a switching frequency of a first switching transistor in the control circuit based on the phase shift angle θ and a first target power or a first target current of the output interface; and
controlling, based on the phase shift angle θ and the switching frequency, the first switching transistor, a second switching transistor, a third switching transistor, and a fourth switching transistor in the control circuit to be on or off,
wherein in the control circuit:
the first switching transistor and the second switching transistor, that are connected in series with each other, are coupled to the input interface in series;
the third switching transistor and the fourth switching transistor, that are connected in series with each other, are coupled to the output interface in series;
the inductor and the capacitor, that are connected in series with each other, are coupled between an end A that is a node on which the first switching transistor and the second switching transistor are connected in series and an end B that is a node on which the third switching transistor and the fourth switching transistor are connected in series; and
a negative electrode of the input interface is coupled to a negative electrode of the output interface, or a positive electrode of the input interface is coupled to a positive electrode of the output interface; wherein:

the determining a phase shift angle θ based on a voltage of the input interface and a target voltage of the output interface comprises determining the phase shift angle θ based on the voltage of the input interface and the target voltage of the output interface by using a phase shift angle calculation formula, the phase shift angle calculation formula is $$\theta = \cos^{-1}\left(\frac{V_{out}}{V_{in}}\right) \text{ when } \frac{V_{out}}{V_{in}} \leq 1, \text{ and}$$

$$\theta = \cos^{-1}\left(\frac{V_{in}}{V_{out}}\right) \text{ when } \frac{V_{in}}{V_{out}} \leq 1,$$

$V_{in}$ is the voltage of the input interface, and $V_{out}$ is the target voltage of the output interface; and/or
the determining a switching frequency based on the phase shift angle θ and first target power or a first target current of the output interface comprises determining the switching frequency based on an output power calculation formula, the phase shift angle θ, and the first target power or the first target current of the output interface, the output power calculation formula is $$P_o = \frac{2 * V_{in} * V_{out}}{\pi^2 * \left(2\pi f_s * L - \frac{1}{2\pi f_s * C}\right)} * \sin\theta,$$

$P_o$ is the first target power of the output interface, $V_{in}$ is the voltage of the input interface, $V_{out}$ is the target voltage of the output interface, $f_s$ is the switching frequency, L is an inductance value of an inductor, C is a capacitance value of a capacitor.

12. The control method according to claim 11, wherein the determining a phase shift angle θ based on a voltage of the input interface and a target voltage of the output interface comprises:
determining the phase shift angle θ based on the voltage of the input interface and the target voltage of the output interface by using the phase shift angle calculation formula.

13. The control method according to claim 11, wherein the determining a switching frequency based on the phase shift angle θ and first target power or a first target current of the output interface comprises:
determining the switching frequency based on the output power calculation formula, the phase shift angle θ, and the first target power or the first target current of the output interface.

14. The control method according to claim 13, wherein after the determining the switching frequency based on an output power calculation formula, the phase shift angle θ, and the first target power or the first target current of the output interface, the method further comprises:
adjusting the switching frequency, and calculating power of the output interface by using the output power calculation formula until the power of the output interface reaches second target power of the output interface.

15. The control method according to claim 13, wherein the determining the switching frequency based on an output power calculation formula, the phase shift angle θ, and the first target power or the first target current of the output interface comprises:

obtaining the first target power of the output interface through calculation by using a target current of the output interface and the target voltage of the output interface; and determining the switching frequency based on the output power calculation formula, the phase shift angle θ, and the first target power or the first target current of the output interface.

16. The control method according to claim 11, wherein the controlling, based on the phase shift angle θ and the switching frequency, the first switching transistor, a second switching transistor, a third switching transistor, and a fourth switching transistor in the control circuit to be on or off comprises:

when the first switching transistor is controlled to be on, controlling the second switching transistor to be off;

when the first switching transistor is controlled to be off, controlling the second switching transistor to be on;

when the third switching transistor is controlled to be on, controlling the fourth switching transistor to be off; and when the third switching transistor is controlled to be off, controlling the fourth switching transistor to be on.

* * * * *